(12) United States Patent
Sakai et al.

(10) Patent No.: US 6,483,656 B1
(45) Date of Patent: Nov. 19, 2002

(54) PILOT LAMP CURRENT CONSUMPTION REDUCTION SYSTEM FOR A FLEXIBLE MAGNETIC DISK DRIVE OR THE LIKE

(75) Inventors: Masakatsu Sakai, Iruma (JP); Takayuki Honda, Musashino (JP); Hiroshi Tsuyuguchi, Tokyo (JP)

(73) Assignee: TEAC Corporation (JP)

( * ) Notice: Subject to any disclaimer, the term of this patent is extended or adjusted under 35 U.S.C. 154(b) by 0 days.

(21) Appl. No.: 09/549,843

(22) Filed: Apr. 14, 2000

(30) Foreign Application Priority Data

Apr. 14, 1999 (JP) ............................................. 11-107131

(51) Int. Cl.⁷ ......................... G11B 19/02; G11B 21/02
(52) U.S. Cl. ........................................... 360/69; 360/75
(58) Field of Search ............................. 360/69, 75, 31, 360/77.02, 78.04, 55

(56) References Cited

U.S. PATENT DOCUMENTS 6,424,481 B1 * 7/2002 Theobald, Jr. et al. ........ 360/69

* cited by examiner

*Primary Examiner*—Andrew L. Sniezek
(74) *Attorney, Agent, or Firm*—Woodcock Washburn LLP

(57) ABSTRACT

A flexible magnetic disk drive to be USB interfaced with a computer, there being a maximum current limitation of 500 milliamperes to be carried by USB cables. The current consumption of the disk drive maximizes when both disk drive motor and stepper motor are in rotation and when, additionally, a pilot lamp glows to warn that the disk is being accessed. The invention takes advantage of the fact that the stepper motor is driven with a motor current that varies periodically with the stepping pulses, each period of the motor current being notionally divisible into approximately two halves such that the motor current is less in magnitude in the first half than in the second. A pilot lamp control circuit causes the pilot lamp to be energized only during the first half of each motor current period, resulting in the blinking of the pilot lamp. Thus the peak of the sum of the motor current and the lamp current during the first half of the motor current period can be made no more than the peak of the motor current alone during the second half.

13 Claims, 6 Drawing Sheets

PILOT LAMP CURRENT CONSUMPTION REDUCTION SYSTEM FOR A FLEXIBLE MAGNETIC DISK DRIVE OR THE LIKE

BACKGROUND OF THE INVENTION

This invention relates to an apparatus for data transfer with a rotating data storage disk such as, typically, a flexible magnetic disk commonly known as floppy disk and, more particularly, to a flexible magnetic disk drive suitable for connection as a peripheral to a personal computer via a universal serial bus (USB) interface. Still more particularly, the invention concerns how to reduce the maximum current requirement of such a disk drive, specifically dealing with the reduction of current consumption by a pilot lamp that is customarily affixed to the front face of the disk drive in order to warn the user that the disk is being accessed.

There recently have been introduced to the market the personal computers that have what is called a universal serial bus (USB) port for connection to a set of peripherals via serial USB interfaces. A plurality of peripherals, each with a USB interface, may be connected to what is termed a USB hub via separate USB cables and thence to the USB port of the computer via a single USB cable. USB connections are generally acknowledged to greatly enhance the utility and versatility of computer systems.

There has, however, been a problem left unsolved in connection with the USB interfacing of personal computers and peripherals. USBs are capable of carrying a current of no more than 500 milliamperes, which means that the maximum current requirement of each computer peripheral should not exceed that limit. Difficulties have been experienced in de signing magnetic disk drives, among other peripherals, so as to meet this requirement. The difficulties arise for the most part from the large current consumptions of the disk drive motor and the stepper motor for transducer positioning, both incorporated in a floppy disk drive to enable the transducers to access the individual storage locations on the disk for reading or writing.

Flexible magnetic disk drives have, moreover, a pilot lamp on the front face of their casing that glows continuously when a disk is loaded in the disk drive, being driven by the disk drive motor, and being read or written upon, as well as when the transducers are being transported by the stepper motor for track seeking. This pilot lamp represents another source of current consumption, adding substantially to current consumptions by the disk drive motor and the transducer positioning motor. The total current requirement of the disk drive maximizes when both disk drive motor and transducer positioning motor are in rotation with the concurrent continuous glowing of the pilot lamp. The present invention is based upon the discovery that, although the current consumptions of the motors may not be reducible, or at least not easily so, that of the pilot lamp is.

SUMMARY OF THE INVENTION

The present invention seeks therefore to lower the maximum current requirement of a disk drive through reduction of the current consumption of the pilot lamp, or equivalent indicator means, without any substantial impairment of the intended functions of the indicator means.

Briefly, the invention may be summarized as a rotating disk data storage apparatus having a reduced maximum current requirement, comprising a positioning motor for moving a transducer or a pair of transducers across track turns on a disk, and a motor driver circuit for controllably driving the positioning motor by causing energization thereof with a periodically varying motor current, each period of the motor current being notionally divisible into a first and a second part such that the motor current is less in magnitude in the first part than in the second. Also included are an indicator such as a pilot lamp for indicating that the positioning motor is in operation, and an indicator control circuit for permitting the indicator to be energized with an indicator current only during the first part of each period of the motor current energizing the positioning motor.

Thus the indicator lamp blinks, instead of glowing continuously as has been the case heretofore, being lit up only during the first part of each period of the motor current when the motor current is less. Consequently, the peak of the sum of the motor current and the indicator current during the first part of the motor current period can be made no more than the peak of the motor current alone during the second part of the motor current period. The current consumption of the glowing lamp does not increase the total current consumption of the complete apparatus when both positioning motor and disk drive motor are in operation; in other words, the maximum current consumption of the apparatus remains the same whether the lamp is on or off.

In preferred embodiments of the invention to be disclosed herein, the apparatus takes the form of a flexible magnetic disk drive, in which the positioning motor is a stepper motor which rotates by discrete increments in response to stepping pulses generated both externally and internally of the disk drive. The present invention is equally well applicable whether the stepper motor is driven by successively exciting one or two phase windings thereof or by alternately exciting one and two phase windings, both according to the prior art. The lamp control circuit for making the pilot lamp glow intermittently takes different forms depending upon which excitation method is employed.

In cases where the stepper motor is driven by the one-or two-phase excitation method, the lamp control circuit incorporates means such as a timer responsive to each stepping pulse for providing a lamp control signal indicative of two divisions of each stepping pulse period, which are equivalent to the first and second parts of each motor current period. The lamp control signal can therefore be used directly for causing the lamp to be energized during the first division of each stepping pulse period.

If the one-two-phase excitation method is employed, on the other hand, then the successive stepping pulse cycles alternate between the cycle during which one phase of the stepper motor is energized and the cycle during which two phases of the stepper motor are energized simultaneously. The current consumption of the stepper motor is of course less during the one-phase excitation cycles than during the two-phase excitation cycles. The lamp control circuit may therefore discriminate between the one- and two-phase excitation cycles of the stepping pulses, causing the pilot lamp to be energized only during the one-phase excitation cycles.

In either case the invention makes utmost use of preexisting parts of the disk drive. No major alteration of such preexisting parts is needed for reduction of the maximum current requirement of the disk drive according to the invention.

The above and other objects, features and advantages of this invention and the manner of achieving them will become more apparent, and the invention itself will best be understood, from a study of the following description and attached claims, with reference had to the accompanying drawings showing the preferred embodiments of the invention.

DESCRIPTION OF THE PREFERRED EMBODIMENTS

Figure 1:
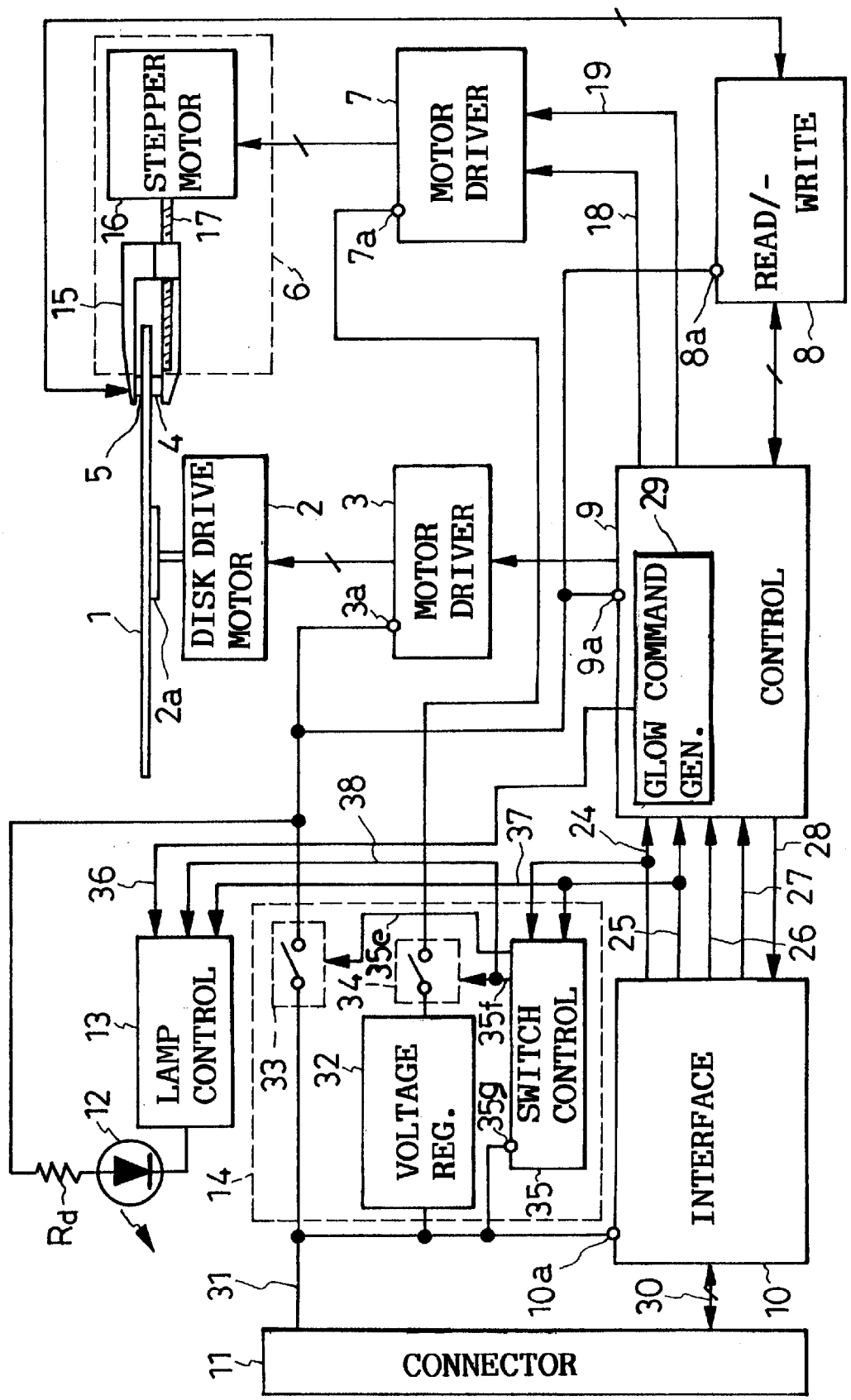
FIG. 1 is a block diagram of the flexible magnetic disk drive incorporating the maximum current consumption reduction system according to this invention, shown together with a magnetic disk replaceably loaded therein.

The present invention is currently believed to be best embodied in a flexible magnetic disk drive designed to be USB interfaced with a personal computer. FIG. 1 diagrammatically illustrates such a disk drive together with a double-sided magnetic disk 1 replaceably mounted in position on a turntable 2a Broadly, the disk drive comprises a disk drive motor 2 for imparting rotation to the turntable 2a and hence to the disk 1, a motor driver circuit 3 for controllably driving the motor, a pair of transducers or magnetic read/write heads 4 and 5 for reading and writing data on the opposite sides of the disk, transducer positioning means 6 for moving the transducers across the tracks on the disk and positioning them on any desired track location, a positioning motor control and driver circuit 7, a read/write circuit 8 connected to both transducers, a control circuit 9 for controlling various working parts of the disk drive including the motor driver circuits 3 and 7 and the read/write circuit 8, and a USB interface 10 connected between the control circuit 9 and a connector 11 for connection of the disk drive to a computer, not shown.

Additional components of the disk drive, perhaps bearing greater pertinence to the instant invention, are a indicator or pilot lamp 12 such as, typically, a light-emitting diode (LED), a pilot lamp control circuit 13, and a power supply circuit 14. These components will be detailed subsequently. There are many other standard components and mechanisms in the disk drive, such as the disk loading mechanism, index sensor, Track Zero sensor, etc., which are all not shown because of their impertinence to the invention.

Inserted into the disk drive, the disk 1 will be conventionally automatically loaded on the turntable 2a which is mounted fast to a spindle shown coupled directly to the disk drive motor 2 for joint rotation therewith. The motor 2 may be a brushless or like direct current motor. The disk is driven by this motor at 300 or 360 revolutions per minute during reading or writing. Connected between disk drive motor 2 and control circuit 9, the motor driver circuit 3 sets the motor into rotation in response to a MOTOR ON signal from the control circuit. At 3a is indicated the supply terminal of the driver circuit 3, which terminal will be referred to in more detail presently.

Usually, the transducer positioning means 6 include a stepper motor 16 for moving the pair of transducers 4 and 5 across the tracks on both sides of the disk 1 and for positioning them on any desired track position. To this end the stepper motor 16 is coupled via a motion translating mechanism such as a lead screw 17 to a carriage 15 to which both transducers 4 and 5 are mounted. The stepper motor driver circuit 7, having a supply terminal 7a, causes the stepper motor 16 to rotate by discrete increments in either of two opposite directions. for positioning the transducers 4 and 5 on any desired track positions on the disk. The control circuit 9 delivers stepping pulses and a stepping direction signal to the stepper motor driver circuit 7 over lines 18 and 19, respectively.

Figure 2:
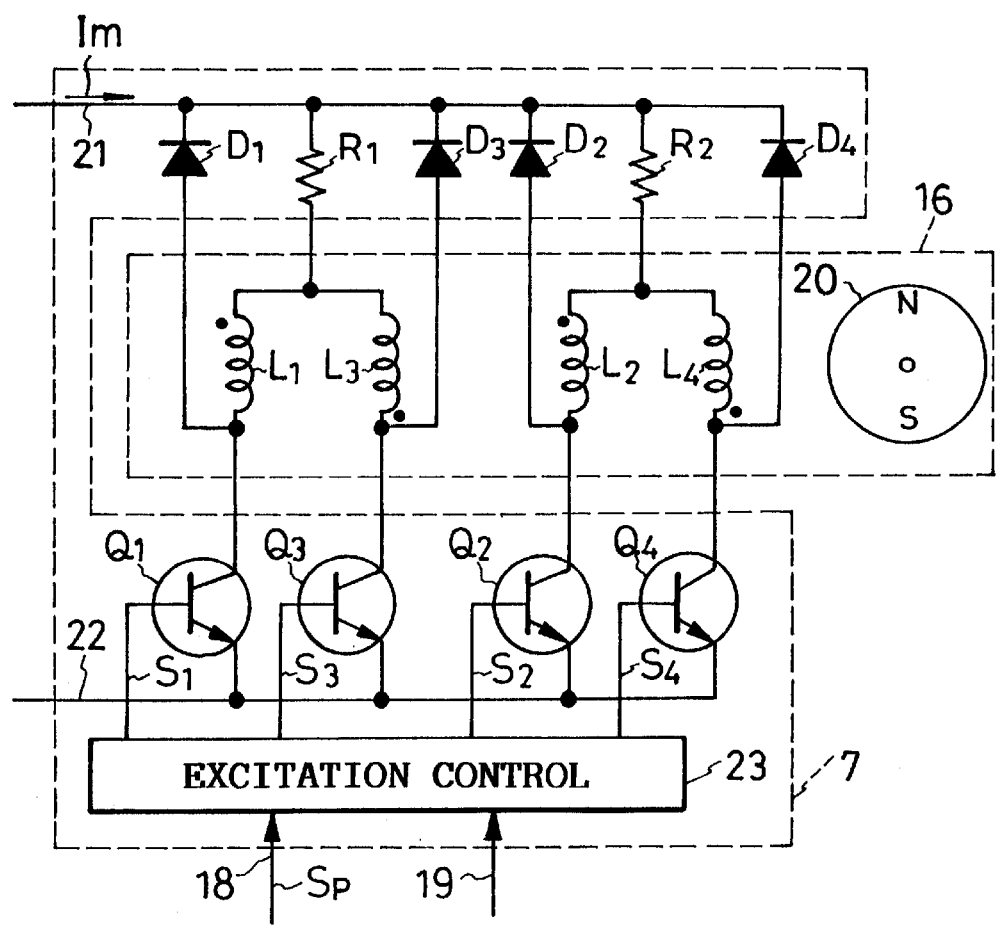
FIG. 2 is a schematic electrical diagram of a four-phase stepper motor for transporting the pair of transducers across data tracks on the disk in the FIG. 1, shown together with a stepper motor driver circuit.

FIG. 2 is a more detailed illustration of the stepper motor 16 and its driver circuit 7. The stepper motor 16 is shown as that of four-phase construction, having four stator windings $L_1$, $L_2$, $L_3$ and $L_4$ and a permanent magnet rotor 20. The first $L_1$, and third $L_3$ windings are wound in opposite directions around the same part of a magnetic core, not shown, and the second $L_2$ and fourth $L_4$ windings in opposite directions on another part of the core.

For unipolar driving of the four-phase stepper motor 16, the driver circuit 7 comprises a pair of d.c. supply lines 21 and 22, four switching transistors $Q_1$, $Q_2$, $Q_3$ and $Q_4$, four diodes $D_1$, $D_2$, $D_3$ and $D_4$, and two resistors $R_1$ and $R_2$. The switching transistors $Q_1$–$Q_4$ are all connected between the pair of d.c. supply lines 21 and 22 via the stator windings $L_1$–$L_4$, respectively, of the stepper motor 16. The first resistor $R_1$ is connected in parallel with the first stepper motor winding $L_1$ via the first diode $D_1$, and with the third stepper motor winding $L_2$ via the third diode $D_3$. The second resistor $R_2$ is connected in parallel with the second stepper motor winding $L_2$ via the second diode $D_2$, and with the fourth stepper motor winding $L_4$ via the fourth diode $D_4$.

These resistors $R_1$ and $R_2$ are used for release of the energies stored on the motor windings $L_1$–$L_4$. Therefore, instead of providing the resistor $R_1$ for both windings $L_1$ and $L_3$, and the resistor $R_2$ for both windings $L_2$ and $L_4$, as shown, four resistors could be provided, each connected in parallel with one winding and in series with one of the diodes $D_1$–$D_4$.

Another component of the FIG. 2 stepper motor driver circuit 7 is an excitation control circuit 23 connected to the bases of the switching transistors $Q_1$–$Q_4$. In response to the stepping pulses Sp delivered by the control circuit 9, FIG. 1, over the conductor 18, the excitation control circuit 23 generates the first to fourth phase excitation control signals $S_1$, $S_2$, $S_3$ and $S_4$ for application to the first to fourth switching transistors $Q_1$–$Q_4$, respectively. The resulting conduction of these transistors $Q_1$–$Q_4$ causes excitation of the associated motor windings $L_1$–$L_4$ and hence rotation of the rotor 20.

Figure 3:
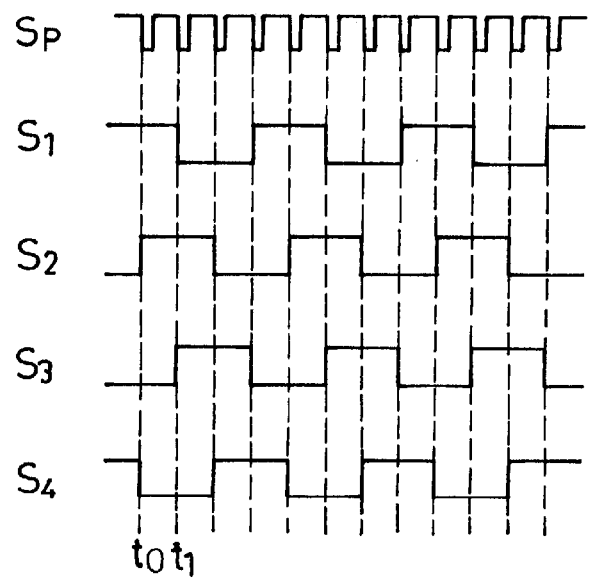
FIG. 3 is a waveform diagram explanatory of the two-phase excitation method employed for driving the FIG. 2 stepper motor.

FIG. 3 is explanatory of how the excitation control signals $S_1$–$S_4$ are generated in predefined time relationship to each other in response to the stepping pulses Sp. It is understood that the stepper motor 16 is unipolar driven in a two-phase excitation sequence in this particular embodiment of the invention. Thus, as will be noted from FIG. 3, there are successive periods, each equal to one stepping pulse cycle, during which the first $S_1$ and second $S_2$ phase excitation control signals are both high, the second $S_2$ and third $S_3$ phase excitation control signals are both high, the third $S_3$ and fourth $S_4$ phase excitation control signals are both high, and the first $S_1$ and fourth $S_4$ phase excitation control signals are both high.

The excitation control circuit 23 also inputs the noted stepping direction signal from the control circuit 9 over the line 19. This signal causes a reversal in the sequence of conductions through the switching transistors $Q_1$–$Q_4$ and hence in the direction of rotation of the stepper motor 16.

With reference back to the disk drive diagram of FIG. 1 the read/write circuit 8 is connected between the pair of transducers 4 and 5 and the control circuit 9. The read/write circuit 8 includes means for conventionally processing data read from the disk 1, and mans for conventionally processing data to be written thereon. A supply terminal for this circuit is indicated at 8a.

The control circuit 9 is connected to the interface 10 for inputting therefrom a motor-on signal, stepping pulses, a stepping direction signal, and write data over lines 24, 25, 26 and 27, respectively. In response to these input signals the control circuit 9 controls the various working parts of the disk drive in order to cause the write data to be written on the disk 1 and the data on the disk to be read. Further the control circuit 9 sends the read data to the interface 10 over a line 28. Actually, there are many more standard signal lines between control circuit 9 and interface 10 but are not shown because of impertinence to the instant invention.

It must be pointed out in connection with the invention, however, that the control circuit 9 conventionally contains what may be termed a glow command generator 29 for causing the pilot lamp 12 to glow as required. The standard practice in the disk drive art is to light up the lamp when the loading of the disk 1 into the disk drive is sensed by the disk sensor, not shown, when the disk drive motor 2 is in rotation, when data is being read or written on the disk, and during seek operations.

The interface 10 is connected between the control circuit 9 and the connector 11 to which a USB cable, not shown, is to be connected. The data that has been recovered from the disk 1 and input to the interface 10 over the line 28 is to be delivered toward the computer over a bus 30. Notwithstanding the showing of FIG. 1, the control circuit 9 and the interface 10 could be connected by use of connectors. It is understood that the interface 10 has a built-in 3.3-volt supply circuit, not shown, because some parts of the interface need a 3.3-volt supply voltage.

The connector 11 has connected thereto the signal bus 30 and power supply bus 31 of a USB cable. Actually, the supply bus 31 is composed of a five-volt supply conductor and a ground conductor, but only the five-volt supply conductor is shown in FIG. 1 for simplicity. The signal bus 30 has two conductors for serial data transmission.

The power supply circuit 14 comprises a 4.3-volts voltage regulator 32, two power switches 33 and 34 which may preferably be both semiconductor switches such as transistors, and a switch control 35 for these switches having a supply terminal 35g. The five-volt supply line 31 is connected directly to all of the 4.3-volt voltage regulator 32, the supply terminal 10a of the interface 10, and the supply terminal 35g of the switch control 35, and, via the first power switch 33, to all of the supply terminal 3a of the disk drive motor driver circuit 3, the supply terminal 8a of the read/write circuit 8, and the supply terminal 9a of the control circuit 9.

The 4.3-volt voltage regulator 32 is a switching regulator for lowering the five-volt input voltage to approximately 4.3volts. The output of this voltage regulator 32 is connected via the second power switch 34 to the supply terminal 7a of the stepper motor driver circuit 7. This second power switch 34 could be omitted, however, and the switching transistor, not shown, included in the 4.3-volt voltage regulator 32 used instead as the second power switch. In this case the 4.3-volt voltage regulator might be turned off when 4.3-volt power delivery to the stepper motor driver circuit 7 is not required.

The switch control 35 has inputs connected to the motor-on signal line 24 and the stepping pulse line 25 between control circuit 9 and interface 10, and outputs connected to the power switches 33 and 34, for making on-off control of these switches in response to the motor-on signal and the stepping pulses. Further one of the outputs of the switch control 35 is connected to the pilot lamp control circuit 13 for commanding a change in the mode of glowing of the pilot lamp 12.

Figure 4:
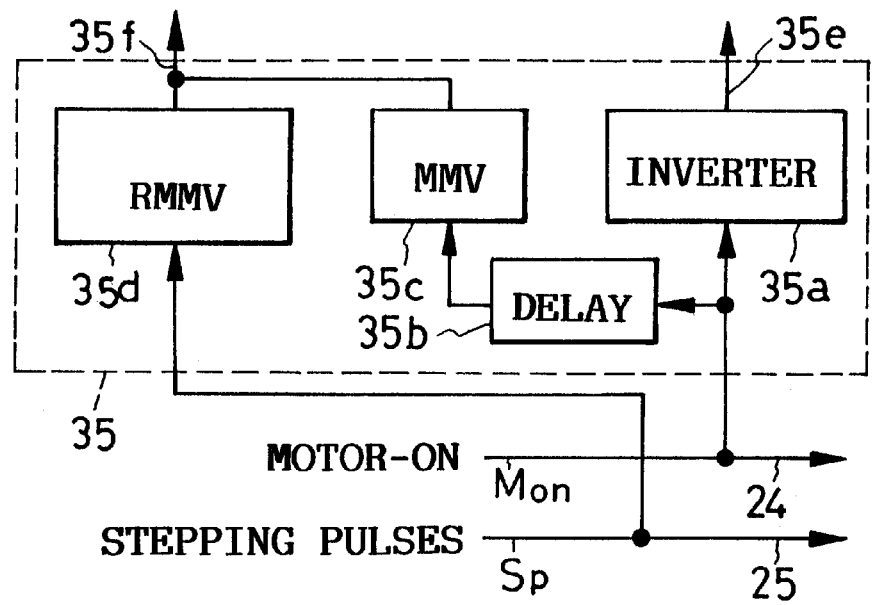
FIG. 4 is a block diagram showing in more detail the switch control used in the FIG. 1 disk drive for on-off control of two power switches shown there.

As illustrated in more detail in FIG. 4, the switch control 35 comprises an inverter 35a connected to the motor-on signal line 24, a timedelay circuit 35b also connected to the motor-on signal line 24 for delaying the motor-on signal prior to application to a monostable multivibrator (MMV) 35c, and a retriggerable MMV 35d connected to the stepping pulse line 25. The inverter 35a inverts the motor-on signal Mon, FIG. 5(A), into a first switch control signal, FIG. 5(C), for application to the first power switch 33 over a line 35e The first power switch 33 is therefore held closed as long as the motor-on signal Mon is low, as from $t_1$ to $t_7$ in FIG. 5, powering the disk drive motor driver circuit 3 to permit rotation of the disk drive motor 2.

The time-delay circuit 35b of the switch control 35, which in essence is a timer in the form of a MMV or counter, provides a signal indicative of a moment $t_2$, FIG. 5, that is later by a preassigned time (e.g. 300 milliseconds) than the moment $t_1$ the motor-on signal Mon goes low. This time delay $t_1$–$t_2$ is approximately equal to the start-up period of the disk drive motor 2, during which this motor picks up speed before starting constant speed rotation and during which, for that reason, the stepper motor driver circuit 7 is conventionally inhibited to drive the stepper motor 16 and so to transport the transducers 4 and 5. Generally, the time delay $t_1$–$t_2$ is from about 250 to about 500 milliseconds.

Connected to the delay circuit 35b the MMV 35c will create a FIG. 5(D) pulse during a recalibration period $t_2$–$t_3$ immediately following the disk drive motor start-up period $t_1$–$t_2$. The recalibration period $t_2$–$t_3$ is a period during which, according to the standard practice in the art, the transducers 4 and 5 are automatically positioned on Track Zero on the disk 1 immediately after the disk drive is powered on or the disk 1 is loaded on the turntable 2a The noted MMV output pulse will be sent over the line 35f to the second power switch 34 thereby closing the same, and so causing the stepper motor driver circuit 7 to be powered from the 4.3-volt voltage regulator 32, during the recalibration period $t_2$–$t_3$. It is understood that the control circuit 9 is conventionally equipped for such recalibration, internally generating stepping pulses during the $t_2$–$t_3$ period for causing the stepper motor 16 to be driven so as to recalibrate the transducers 4 and 5.

Figure 5:
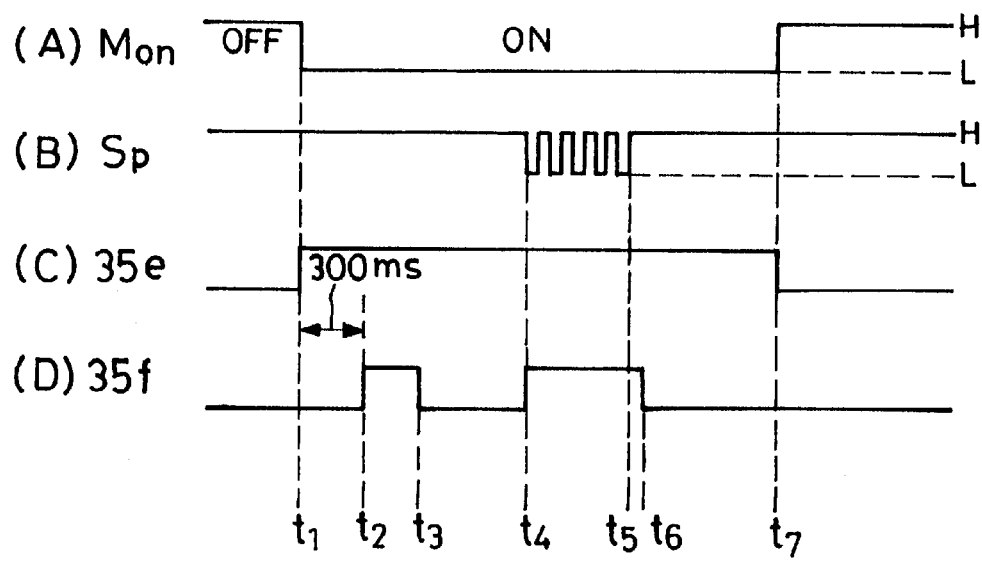
FIG. 5, consisting of (A) through (D), is a waveform diagram explanatory of the operation of the FIG. 4 switch control.

Then the interface 10 will put out a series of stepping pulses Sp over the line 25 for track seek operation, as indicated from $t_4$ to $t_5$ at (B) in FIG. 5. These stepping pulses are understood to be external, supplied from the unshown computer, in contrast to the internally generated stepping pulses of the recalibration period $t_2$–$t_3$. Triggered and retriggered by these external stepping pulses Sp, the RMMV 35d will put out a pulse lasting from $t_4$ to $t_6$, as indicated also at (D) in FIG. 5. This pulse will also be applied over the line 35f to the second power switch 34 for closing the same during the $t_4$–$t_6$ period. As is well known, the RMMV goes high in response to the first of a series of trigger pulses and remains so as long as the succeeding pulses are input with a cycle not exceeding a preset limit. Since the cycle of the stepping pulses is understood to be less than this limit, the RMMV 35d will go low upon lapse of the preset time following the last of the FIG. 5(B) stepping pulses.

Consequently, the second power switch will be held closed during the $t_4$–$t_6$ to period which thoroughly covers the $t_4$–$t_5$ period during which the stepping pulses are generated as at (B) in FIG. 5. The 4.3-volt supply voltage will therefore be applied to the stepper motor driver circuit 7 from $t_4$ to $t_6$. No power is consumed by the stepper motor driver circuit 7 when the second power switch 34 is open.

Notwithstanding the foregoing discussion of FIG. 4, the motor-on signal and stepping pulses may not necessarily be relied upon for on-off control of the power switches 33 and 34. The control signals for these power switches may, instead, be created by utilizing the central processor unit, not shown, included in the interface 10.

FIG. 1 shows that the pilot lamp 12 is connected via a current limiting resistor Rd between the five-volt output line of the first power switch 33 and the pilot lamp control circuit 13. Thus the pilot lamp 12 will glow when the output voltage of the control circuit 13 is zero or less than five volts. The pilot lamp control circuit 13 has inputs connected by way of a line 36 to the aforesaid glow command generator 29 of the disk drive control circuit 9, by way of a line 37 to the stepping pulse line 25, and by way of a line 38 to the output line 35f of the switch control 35.

Figure 6:
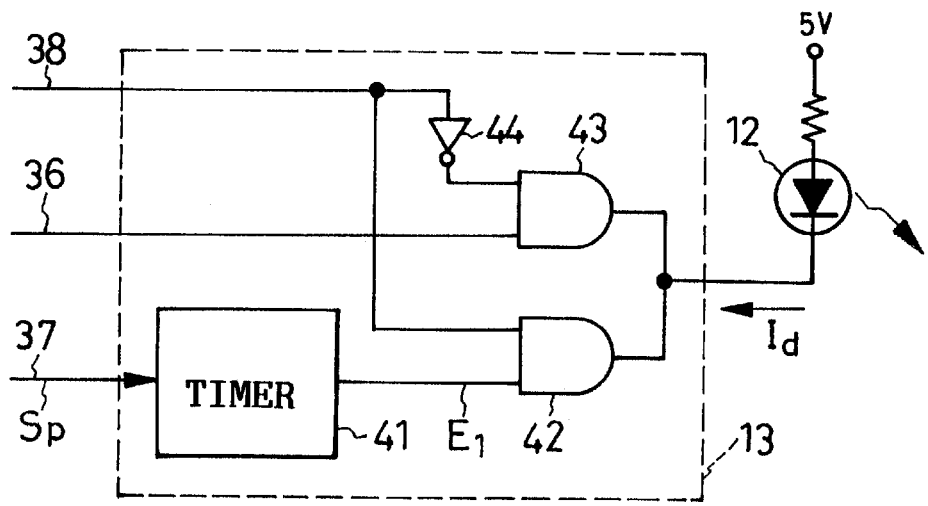
FIG. 6 is a block diagram showing in more detail the pilot lamp control circuit of the FIG. 1 disk drive.

As illustrated in detail in FIG. 6, the pilot lamp control circuit 13 comprises a timer 41, two AND gates 42 and 43, and a NOT circuit 44. Connected to the stepping pulse line 37, the timer 41 will provide a pilot lamp control signal $E_1$, FIG. 7(B), in response to the stepping pulses Sp, FIG. 7(A). The pilot lamp control signal $E_1$ consists of a series of "negative" pulses in order to cause the pilot lamp 12 to blink instead of glowing continuously. Broadly, the duration $T_1$ of each pilot lamp control pulse can be less (50 percent in FIG. 7) than the period Ts of the stepping pulses Sp. More strictly speaking, however, the pilot lamp control pulse duration $T_1$ should be from about 20 to about 80 percent of the stepping pulse period Ts, because the pilot lamp would blink too faintly if the duration $T_1$ were made less than the lower limit, and no satisfactory reduction of current consumption would result if the duration $T_1$, exceeded the upper limit.

The AND gate 42 of the pilot lamp control circuit 13 has an input connected to the timer 41, and another to the output line 35f of the switch control 35 by way of the line 38. As has been explained with reference to FIG. 5, the switch control output line 35f and therefore the pilot lamp control circuit input line 38 are high both when the internal stepping pulses are being generated, as from $t_2$ to $t_3$ in FIG. 5, and when the external stepping pulses are being supplied, as from $t_4$ to $t_6$ in FIG. 5. During these $t_2$–$t_3$ and $t_4$–$t_6$ periods, therefore, the output from the AND gate 42 is equivalent to the pilot lamp control signal $E_1$ produced by the timer 41.

Figure 7:
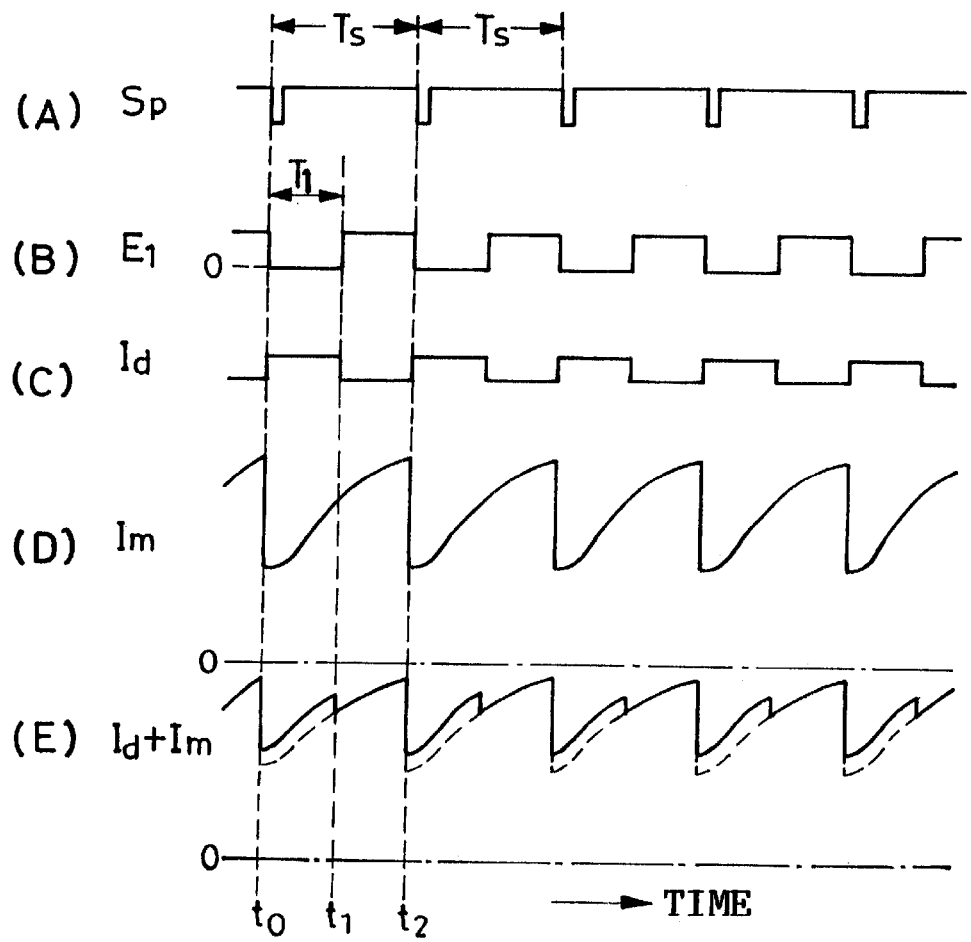
FIG. 7, consisting of (A) through (E), is a waveform diagram explanatory of how the pilot lamp is made to blink in step with the excitation of the FIG. 2 stepper motor, and of how the total current consumption of the stepper motor and the pilot lamp is reduced according to the invention.

FIG. 7 depict waveforms appearing in various parts of the showings of both FIGS. 2 and 6 when the switch control output line 35f is high. As will be apparent from the previous discussion of FIG. 6, the AND gate 42 will pass the series of "negative" output pulses $E_1$ of the timer 41 when the stepping pulses Sp, both internal or external, are being supplied with the prescribed cycle Ts. A lamp current Id FIG. 7(C), will flow into the pilot lamp 12, causing the same to glow, each time the AND gate 42 goes low. Since the lamp current Id will flow intermittently as a natural result of the intermittently low state of the AND gate 42, the pilot lamp 12 will blink.

Operation

Applied to the stepper motor control circuit 7, shown in detail in FIG. 2, the stepping pulses will cause the same to cause excitation of the four phase windings $L_1$–$L_4$ of the stepper motor 16 in a predefined sequence. Assume for instance that the fourth switch $Q_4$ of the stepper motor control circuit 7 is turned off, and the second switch $Q_4$ turned on, at to in FIG. 7. Then the fourth phase winding $L_4$ will become deenergized, and the second phase winding $L_2$ energized instead from the pair of d.c. supply lines 21 and 22. Since the stepper motor 16 is understood to be driven by the two-phase excitation method in this particular embodiment of the invention, the first switch $Q_1$ has already been on at $t_0$, permitting energization of the first phase winding $L_1$. The magnitude of the stepper motor input current Im, FIG. 7(D), from $t_0$ to $t_2$ in FIG. 7, or from $t_o$ to $t_1$ in FIG. 3, is therefore the sum of the currents flowing through both first and second phase windings $L_1$ and $L_2$. Since the motor windings have inductance, the current Im will rise gradually and with a delay.

Incidentally, when the fourth switch $Q_4$ is turned off at $t_0$, the energy that has been stored on the fourth phase winding $L_4$ will be released. The result will be the flow of current through the closed circuit comprised of the fourth phase winding $L_4$, the fourth diode $D_4$, and the second resistor $R_2$.

At (E) in FIG. 7 is shown the sum of the pilot lamp current Id and the stepper motor current Im. It will be appreciated that the pilot lamp current Id flows only during approximately the first half ($t_0$ to $t_1$) of each stepping pulse period Ts, FIG. 7(A), that is, the duration $T_1$, FIG. 7(B), of each "negative" pilot lamp control pulse $E_1$ produced by the timer 41, FIG. 6, of the pilot lamp control circuit 13. The pilot lamp current Id does not flow during approximately the second half ($t_1$ to $t_2$) of each stepping pulse period Ts, during which exists the peak of the motor current Im. Thus, as the pulse duration $T_1$ of the pilot lamp control signal $E_1$ is set at approximately 50 percent of the stepping pulse period Ts in this embodiment of the invention, the peak of the sum of the pilot lamp current Id and the stepper motor current Im is made less than the peak of the motor current Im alone. The maximum current consumption of the disk drive, including the concurrent current consumptions of the disk drive motor 2, the stepper motor 16 and the pilot lamp 12, can therefore be held less than the limit of 500 milliamperes imposed by USB cables.

Depending upon how long the pilot lamp control pulse duration $T_1$ is set on the timer 41 relative to the stepping pulse period Ts, the peak of the sum Id+Im of the pilot lamp current and the motor current may become greater than that of the motor current Im alone. Even in this case, however, the peak of the sum Id+Im will be less than the sum of the peak of the motor current Im alone and the peak of the pilot lamp current Id alone, resulting in significant curtailment of the maximum current requirement of the disk drive.

The pilot lamp 12 is to glow in this particular embodiment of the invention not only during seek operations but also whenever commanded by the glow command generator 29, FIG. 1, of the disk drive control circuit 9. In order to respond to the glow commands from this generator 29 the plot lamp control circuit 13 includes the second AND gate 43, FIG. 6, having its output connected to the pilot lamp 12. The second AND gate 43 has one input connected by way of the line 36 to the glow command generator 29, and another other input connected by way of the line 38 to the output line 35f of the switch control 35, the line 38 having the inverter 44.

As has been mentioned with reference to FIG. 4, the switch control output line 35f is high when stepping pulses are on the interface output line 25, as for track seeking. The glow command generator 29, on the other hand, is low when issuing a glow command. Because of the provision of the inverter 44 on the input line 38, the glow command is permitted to pass the second AND gate 43 when the switch control output line 35f is low, indicating that seek operations are not under way. The glow command on being admitted through the second AND gate 43 will cause the pilot lamp 12 to glow.

The showing of FIG. 6, teaching use of two AND gates and one NOT circuit, represents but one method of lighting up the pilot lamp 12 both during track seeking and in response to glow commands from the disk drive control circuit 9. The same objective can be accomplished by various other logic circuitry or multiplexers or switching circuits without departing from the scope of this invention.

It has been conventionally practiced in the art to light up the pilot lamp in response to glow commands sent over the line 36. The present invention requires a slight modification in the preexisting circuitry for reduction of the peak current consumption during track seek operations.

Second Form

Figure 8:
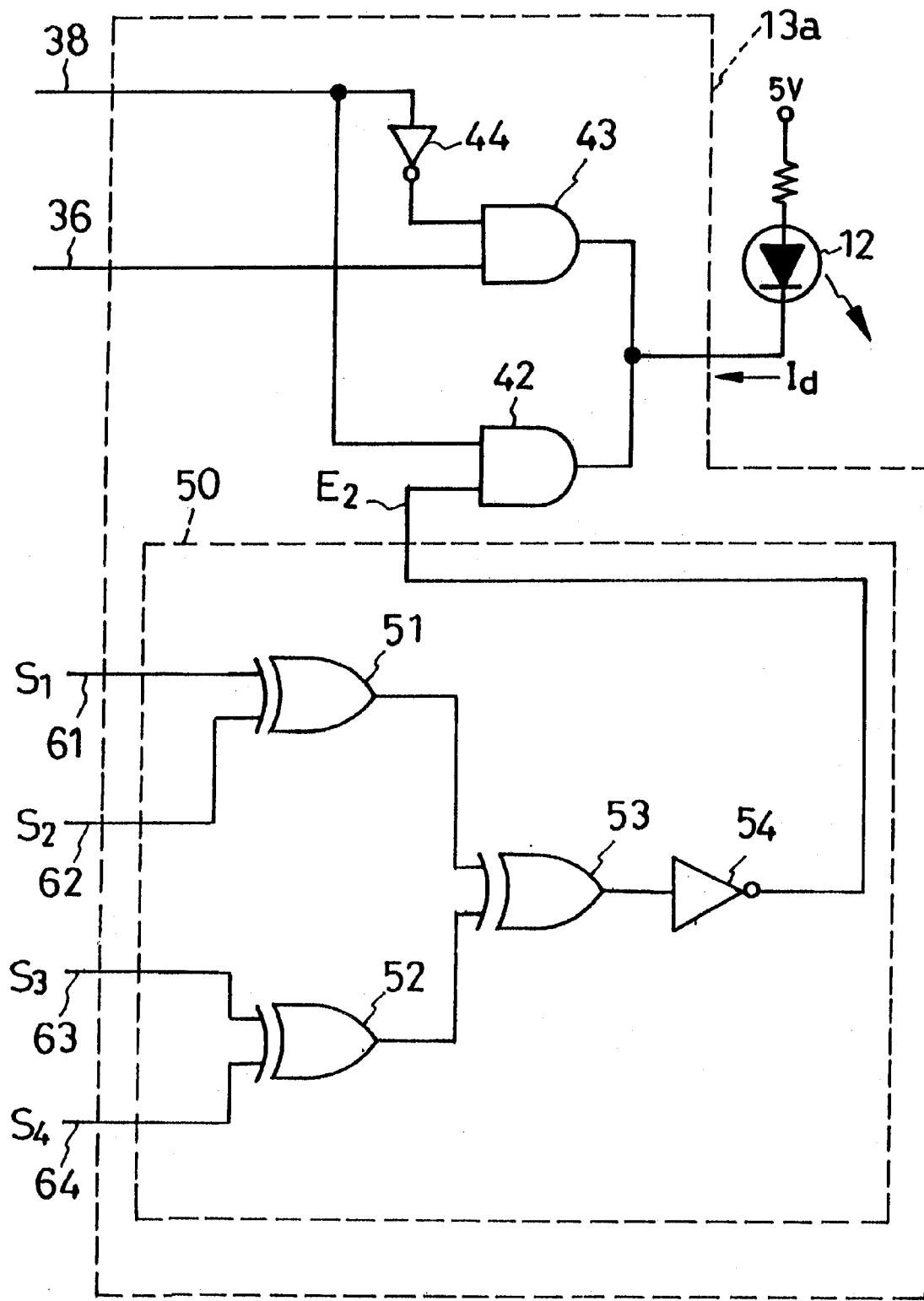
FIG. 8 is a schematic electrical diagram of a modified pilot lamp control circuit according to the invention.

The present invention is applicable to those disk drives where the stepper motor for transducer positioning is driven by the familiar one-two-phase excitation method. In this application the pilot lamp control circuit 13, FIG. 6, of the first disclosed embodiment is modified as shown in FIG. 8 in order to conform to the different excitation method employed here. The other details of construction can be as set forth above in connection with the first embodiment.

Figure 9:
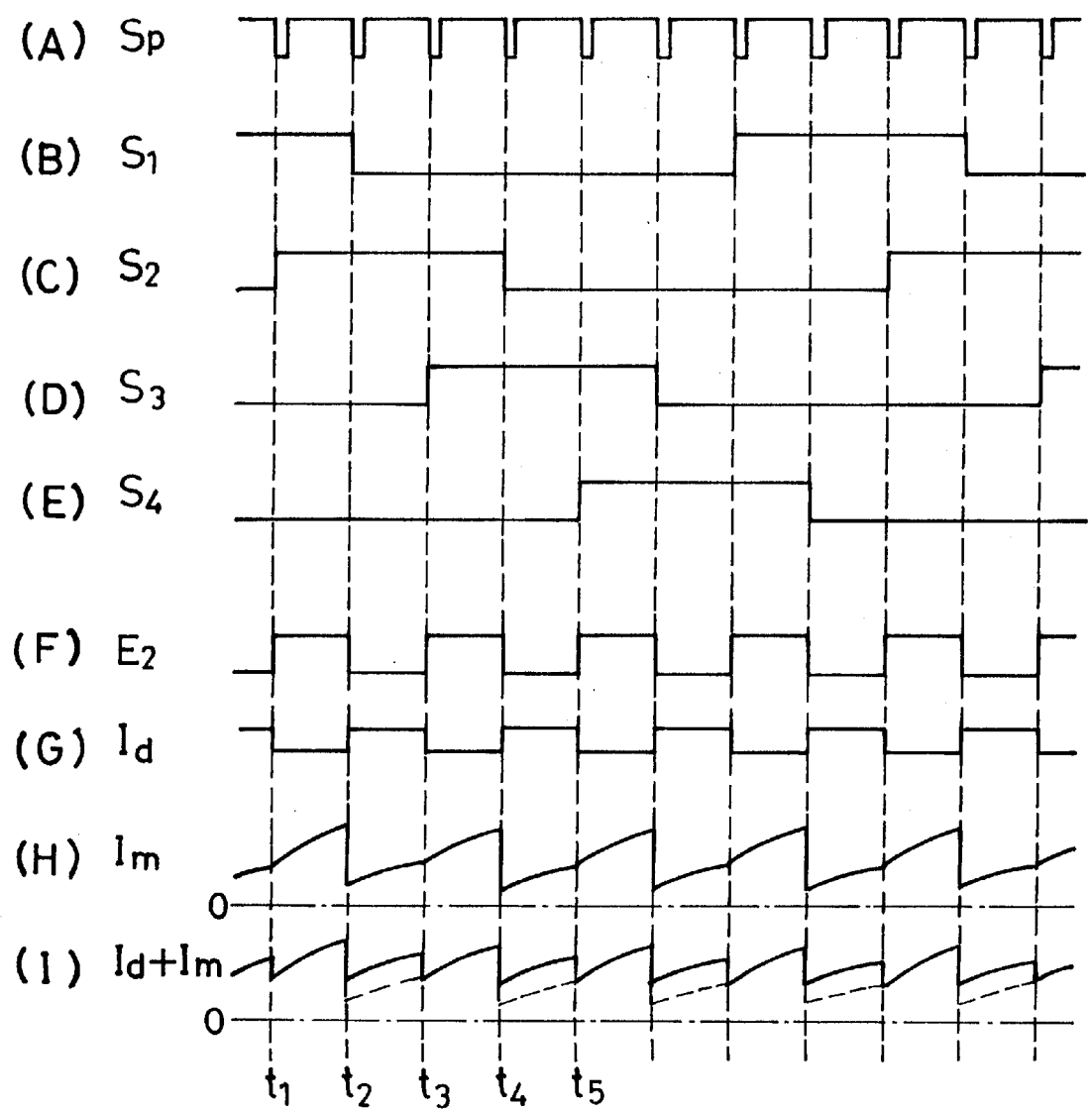
FIG. 9, consisting of (A) through (I), is a waveform diagram explanatory of the one-two-phase excitation method for driving the stepper motor in the alternate embodiment of FIG. 8, of how the pilot lamp is made to blink in step with the one-two-phase excitation of the stepper motor, and of how the total current consumption of the stepper motor and the pilot lamp is reduced according to the invention.

Reference may be had to the waveform diagram of FIG. 9 for a brief explanation of the one-two-phase excitation of the stepper motor. Given at (B)–(E) in this figure are the first to fourth phase excitation control signals $S_1$–$S_4$ for controlling the excitation of the four phase windings $L_1$–$L_4$, FIG. 2, of the stepper motor 16 through on-off control of the four switching transistors $Q_1$–$Q_4$ of the stepper motor driver circuit 7.

It will be noted that each excitation control signal alternates between a high state lasting three cycles of the stepping pulses Sp, FIG. and a low state lasting five cycles of the stepping pulses. The time relationship among the four excitation control signals $S_1$–$S_4$ is such that periods in which only one phase is excited alternate with periods in which two phases are simultaneously excited. For instance, according to the showing of FIG. 9, both first and second phases are excited from $t_1$ to $t_2$; only the second phase is from $t_2$ to $t_3$ both second and third phases are from $t_3$ to $t_4$; and only the third phase is from $t_4$ to $t_5$. The motor current Im; FIG. 9(H), is of course greater when any two phases are being excited concurrently than when any one is being excited.

With reference back to FIG. 8 the modified pilot lamp control circuit 13a features a circuit 50 for detecting those periods (e.g. $t_2$–$t_3$ and $t_4$–$t_5$) when only one phase is being excited. The one-phase excitation period detector circuit 50, so to say, is connected in place of the timer 41, FIG. 6, of the first disclosed pilot lamp control circuit 13. The modified pilot lamp control circuit 13a is akin to the FIG. 6 circuit 13 in the other details of configuration.

The one-phase excitation period detector circuit 50 comprises three exclusive OR gates 51, 52 and 53 and a NOT circuit 54. The first exclusive OR gate 51 has an input connected to the output line 61 of the excitation control circuit 23, FIG. 2, for first phase excitation control signal $S_1$, and another input connected to the excitation control circuit output line 62 for the second phase excitation control signal $S_2$. The second exclusive OR gate 52 has an input connected to the excitation control circuit output line 63 for the third phase excitation control signal $S_3$, and another input connected to the excitation control circuit output line 64 for the fourth phase excitation control signal $S_4$. Both first 51 and second 52 exclusive OR gates have their outputs connected to the third exclusive OR gate 53, whose output is connected via the NOT circuit 54 to the AND gate 42. The NOT circuit 54 may of course be integrated with the exclusive OR gate 54 in the practice of the invention.

Operation of Second Form

A study of the FIG. 8 logic circuit diagram of the one-phase excitation period detector circuit 50 together with the FIG. 9(B)–(E) excitation control signals $S_1$–$S_4$ will reveal that the output $E_2$ from this circuit is low during the one-phase excitation periods, as indicated at (F) in FIG. 9. Delivered to the AND gate 42 just like the output $E_1$, FIG. 6, from the timer 41, the output $E_2$ from the circuit 50 will be allowed through that AND gate during seek operations only. Thus the pilot lamp 12 will glow when either one phase of the stepper motor 16 is being excited during track seeking, as from $t_2$ to $t_3$ and from $t_4$ to $t_5$, and not when any two phases of the stepper motor are being excited concurrently, as from $t_1$ to $t_2$ and from $t_3$ to $t_4$.

Thus, as plotted at (G) in FIG. 9, the pilot lamp current Id will flow only when one motor phase is being excited. The stepping motor current Im is of course less when only one motor phase is being excited than when two motor phases are, as Indicated at (H) in FIG. 9. The pilot lamp current Id is added to the motor current Im only during its one-phase excitation periods. Therefore, as is apparent from (I) in FIG. 9, the peak of the resultant, Id+Im, of the lamp current and motor current can be made less than the simple addition of the peak of the lamp current and the peak of the motor current.

Possible Modifications

Notwithstanding the foregoing detailed disclosure, it is not desired that the present invention be limited by the exact showing of the drawings or the description thereof. A variety of modifications and alterations of the illustrated embodiments will suggest themselves to one skilled in the art in order to conform to design preferences or to the requirements of each specific application of the invention.

For example, the invention is applicable in cases where the stepper motor is driven by the one-phase excitation method, instead of by the two-phase and one-two-phase excitation methods employed in the illustrated embodiments. The stepper motor itself may be replaced by other motors of more or less comparable designs within the scope of this invention. It is also understood that the invention is applicable to a variety of magnetic or optical disk drives other than the flexible magnetic disk drives employed in the foregoing embodiments.

It is therefore appropriate that the invention be construed broadly and in a manner consistent with the fair meaning or proper scope of the claims which follow.

What is claimed is:

1. A rotating disk data storage apparatus having a reduced maximum current requirement, comprising:
    (a) a transducer for data transfer with a rotating data storage disk;
    (b) a positioning motor for moving the transducer across track turns on the disk;
    (c) a motor driver circuit for controllably driving the positioning motor by causing energization thereof with a periodically varying motor current, each period of the motor current being notionally divisible into a first and a second part such that the motor current is less in magnitude in the first part than in the second;
    (d) an indicator for indicating that the positioning motor is in operation; and
    (e) an indicator control circuit for permitting the indicator to be energized with an indicator current only during the first part of each period of the motor current energizing the positioning motor;
    (f) whereby a peak of the sum of the motor current and the indicator current during the first part of the motor current period can be made no more than a peak of the motor current alone during the second part of the motor current period.

2. The rotating disk data storage apparatus of claim 1 wherein the positioning motor is a stepper motor which rotates by discrete increments in response to stepping pulses, and wherein the indicator control circuit comprises a circuit element responsive to each stepping pulse for providing a indicator control signal indicative of two divisions of each stepping pulse cycle which correspond to the first and the second part of each period of the motor current.

3. The rotating disk data storage apparatus of claim 2 wherein that one of the two divisions of each stepping pulse cycle which corresponds to the first part of each period of the motor current is from about 20 to about 80% of each stepping pulse cycle.

4. The rotating disk data storage apparatus of claim 2 wherein the circuit element is a timer.

5. The rotating disk data storage apparatus of claim 2 wherein the indicator control circuit further comprises gate means for permitting the indicator to be energized intermittently only when the stepping pulses are being supplied at prescribed intervals.

6. The rotating disk data storage apparatus of claim 5 wherein the apparatus includes means for generating an indicator energization command when a data storage disk is loaded in the apparatus, when a disk drive motor is in rotation, or when the transducer is reading or writing to the disk, and wherein the indicator control circuit further comprises second gate means for permitting the indicator to be energized in response to the indicator energization command only when the stepping pulses are not being supplied at the prescribed intervals.

7. The rotating disk data storage apparatus of claim 1 wherein the positioning motor is a stepper motor which rotates by discrete increments in response to stepping pulses, wherein the motor driver circuit drives the stepper motor by a one-two-phase excitation method such that each period of the motor current is divisible into a first part during which one phase of the stepper motor is energized and a second part during which two phases of the stepper motor are energized, and wherein the indicator control circuit comprises means connected to the motor driver circuit for discriminating between the first and the second part of each motor current period in order to cause the indicator to be energized only when one phase of the stepper motor is being energized.

8. The rotating disk data storage apparatus of claim 7 wherein the indicator control circuit further comprises gate means for permitting the indicator to be energized intermittently only when the stepping pulses are being supplied at prescribed intervals.

9. A rotating disk data storage apparatus having a reduced maximum current requirement, comprising:
    (a) a transducer for data transfer with a rotating data storage disk;
    (b) a steper motor for moving the transducer across track turns on the disk, the stepper motor having a plurality of phases of windings to be excited in a prescribed sequence to cause incremental rotation of a rotor;
    (c) an interface capable of supplying stepping pulses;
    (d) a motor driver circuit for controllably driving the stepper motor, the motor driver circuit having an excitation control circuit responsive to the stepping pulses for causing excitation of the windings of the stepper motor with a periodically varying motor current, each period of the motor current being notionally divisible into a first and a second part such that the motor current is less in magnitude in the first part than in the second;
    (e) a pilot lamp; and
    (f) a lamp control circuit connected between the interface and the pilot lamp for permitting the pilot lamp to be energized with a lamp current only during the first part of each period of the motor current energizing the positioning motor;
    (g) whereby a peak of the sum of the motor current and the lamp current during the first part of the motor current period can be made no more than a peak of the motor current alone during the second part of the motor current period.

10. The rotating disk data storage apparatus of claim 9 wherein the lamp control circuit comprises a timer responsive to each stepping pulse for producing a lamp control pulse having a duration less than the period of the stepping pulses, in order to cause the pilot lamp to be energized only during the duration of each lamp control pulse.

11. The rotating disk data storage apparatus of claim 9 further comprising:
    (a) a power switch connected to the stepper motor driver circuit for powering the same; and
    (b) a switch control circuit having an input connected to the interface and an output connected to the power switch for closing the power switch when the stepping pulses are being supplied at prescribed intervals;
    (c) the lamp control circuit further comprising gate means connected to the output of the switch control circuit for permitting the pilot lamp to be energized intermittently only when the stepping pulses are being supplied at the prescribed intervals.

12. The rotating disk data storage apparatus of claim 9 wherein the excitation control circuit of the motor driver circuit produces a set of excitation control signals for one-two-phase excitation of the stepper motor, such that each period of the motor current is divisible into a first part during which one phase winding of the stepper motor is energized and a second part during which two phase windings of the stepper motor are energized, and wherein the lamp control circuit comprises means connected to the excitation control circuit of the motor driver circuit for discriminating between the first and the second part of each motor current period in order to cause the pilot lamp to be energized only during the first part of each motor current period.

13. The rotating disk data storage apparatus of claim 12 further comprising:

(a) a power switch connected to the stepper motor driver circuit for powering the same; and (b) a switch control circuit having an input connected to the interface and an output connected to the power switch for closing the power switch when the stepping pulses are being supplied at prescribed intervals;

(c) the lamp control circuit further comprising gate means connected to the output of the switch control circuit for permitting the pilot lamp to be energized intermittently only when the stepping pulses are being supplied at the prescribed intervals.

\* \* \* \* \*